United States Patent
Dick

(10) Patent No.: US 6,520,305 B2
(45) Date of Patent: Feb. 18, 2003

(54) CLUTCH COLLAR

(75) Inventor: Wesley M. Dick, Fort Wayne, IN (US)

(73) Assignee: Spicer Technology Inc., Fort Wayne, IN (US)

( * ) Notice: Subject to any disclaimer, the term of this patent is extended or adjusted under 35 U.S.C. 154(b) by 0 days.

(21) Appl. No.: 09/839,543

(22) Filed: Apr. 20, 2001

(65) Prior Publication Data

US 2002/0153220 A1 Oct. 24, 2002

(51) Int. Cl.⁷ .................................................. F16D 11/10
(52) U.S. Cl. .................... 192/69.8; 192/108; 192/114 R
(58) Field of Search ................................ 192/69.8, 108, 192/114 R

(56) References Cited

U.S. PATENT DOCUMENTS

| | | |
|---|---|---|
| 2,708,993 A | 5/1955 | Munschauer |
| 2,787,355 A * | 4/1957 | Dodge .................... 192/108 X |
| 2,883,020 A * | 4/1959 | Kummich et al. ..... 192/69.8 X |
| 4,307,795 A | 12/1981 | Roy |
| 4,340,134 A | 7/1982 | Reiss |
| 4,782,721 A | 11/1988 | Dick |
| 4,953,678 A | 9/1990 | Page et al. |
| 4,960,344 A | 10/1990 | Geisthoff et al. |
| 5,038,884 A | 8/1991 | Hamada et al. |
| 5,273,499 A * | 12/1993 | Friedl et al. ............ 192/108 X |
| 5,715,901 A * | 2/1998 | Tokushima ................ 180/65.6 |

\* cited by examiner

Primary Examiner—Richard M. Lorence
(74) Attorney, Agent, or Firm—Hahn Loeser & Parks, LLP; Robert J. Clark

(57) ABSTRACT

A collar for a clutch, particularly a clutch used in selectively connecting and disconnecting a source of drive torque with a co-axial driven shaft. More particularly, the present invention relates to a collar wherein meshing surfaces of the torque source and the driven shaft are designed such that the collar is under a neutral axial force while under torque. The shift collar is splined to a rotating shaft and is slideable along the direction of the longitudinal axis of the shaft. Translation of the shift collar is preferably performed by means of a shift mechanism in association with a detent ball, used to self-lock the shift collar in place under torque load. When the shift mechanism and detent ball are moved to release the shift collar, the angle teeth and splines cause the shift collar to disengage, even under high torque load.

3 Claims, 2 Drawing Sheets

CLUTCH COLLAR

The present invention relates to an improved collar for a clutch, particularly a clutch used in selectively connecting and disconnecting a source of drive torque with a co-axial driven shaft. More particularly, the present invention relates to a collar wherein meshing surfaces of the torque source and the driven shaft are designed such that the collar is under a neutral axial force while under torque.

BACKGROUND OF THE INVENTION

Various all-wheel-drive vehicles have been developed for higher stability and maneuverability during travel of the vehicles. Many such all-wheel-drive vehicles have a part-time four-wheel-drive feature, which can switch, as desired, between a two-wheel mode and a four-wheel mode. Four-wheel drive is highly desirable for off-road travel over rough terrain because of the greater reliability in traction in such conditions, but on the usual hard, improved surface roads, vehicles can be more economically operated as a two-wheel conventional drive vehicle. The capability of shifting of a four-wheel drive vehicle to two-wheel driving and return therefore is highly desirable dependent on the conditions of traction confronted.

All-wheel-drive vehicles of this type have a clutch on a rotatable drive shaft in order to selectively transmit drive torque from a power source via the rotatable drive shaft to the driven wheels. Many of these vehicles use a clutch mechanism which is selectively engaged and disengaged to switch the vehicle between two-wheel-drive and four-wheel-drive modes. The clutch typically employs a clutch collar and has meshing teeth for torque transmission from a drive shaft to an output shaft or gear. While these clutches generally provide reliable torque transmission, problems still exist in situations where the clutch must disengage under high torque loads or when the difference between the relative speeds of the shafts is large. These type of clutches have problems in that the meshing surfaces of the teeth are parallel to the input and output shafts, which requires a large operating force for disconnecting the shafts in order to overcome the meshing forces applied to the meshing surfaces, and also in that it produces a shock and noise due to impact engagement of the teeth when connecting the shafts if the difference between the rotational speeds of the shafts is too large.

Therefore, there exists a need for an improved manner of engaging and disengaging a clutch under heavy torque load without requiring a large operating force to engage or disengage the clutch collar.

SUMMARY OF THE INVENTION

It is an object of this invention to overcome the deficiencies in the prior art by providing an improved clutch shift collar mechanism wherein meshing surfaces of the torque source and the driven shaft are designed such that the collar is under a neutral axial force while under torque.

According to the present invention, a clutch collar, formed as a sleeve which is coaxial with a rotating shaft, is used to engage a clutch mechanism to transfer rotation to another member or the like. The shift collar is preferably splined to a rotating shaft and is slideable along the direction of the longitudinal axis of the shaft. In a first embodiment, the shift collar mechanism includes angled teeth adapted to engage similar angle teeth within one of the rotating shafts, wherein the angle teeth and splines are designed such that the shift collar has a neutral axial force under torque. Translation of the shift collar is preferably performed by means of a shift mechanism in association with a detent ball, used to lock the shift collar in place under torque load. When the shift mechanism and detent ball are moved to release the shift collar, the angle teeth and splines cause the shift collar to disengage, even under high torque load. In this manner the shift collar is self-unlocking.

In a second embodiment, the shift collar preferably engages another member via face teeth displaced from the centerline of a rotating shaft on which the collar slides. The face tooth angle is designed such that the force vector along the centerline of the rotating shaft due to torque is approximately equal to the friction force of the shift collar splines along the shaft centerline. A similar shift mechanism and detent ball to the first embodiment is used to move the shift collar into engagement with the shift collar being self-unlocking.

Other advantages and novel features of the present invention will become apparent in the following detailed description of the invention when considered in conjunction with the accompanying drawings.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
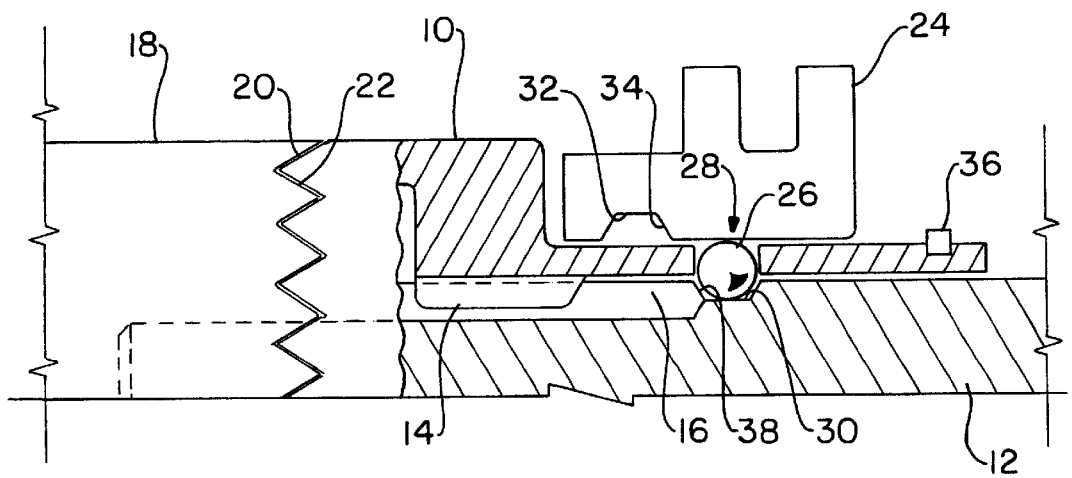
FIG. 1 shows the shift collar mechanism of the present invention in the locked, torque engaging position.
Figure 2:
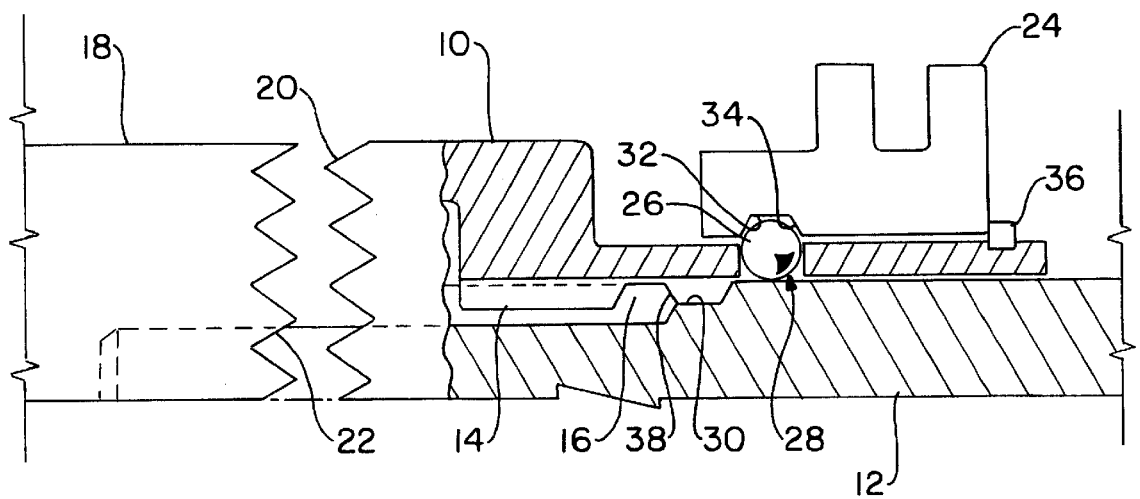
FIG. 2 shows the shift collar mechanism of the present invention as shown in FIG. 1, in the disengaged position.

In a first embodiment of the present invention as shown in FIGS. 1 and 2, a clutch shift collar 10, is shown formed as a sleeve which is coaxial with a first rotating shaft 12. The shift collar 10 is attached to the first rotating shaft 12 by splines 14 which slidingly engage corresponding splines 16 of the first rotating shaft 12 such that torque is transmitted from the first rotating shaft 12 through the shift collar 10 to a second rotating shaft 18. The shift collar 10 comprises an angled gear teeth portion 20 which are adapted to engage similar angle teeth 22 of the second rotating shaft 18. The angle teeth 20, 22 and splines 14, 16 are designed such that the shift collar 10 has a neutral axial force under torque. The shift collar 10 is slideable along the direction of the longitudinal axis of the first rotating shaft 12. Translation of the shift collar 10 is preferably performed by means of a shift mechanism 24 in association with a detent ball 26, used to self-lock the shift collar 10 in place under torque load. The detent ball 26 is positioned within an aperture 28 of the shift collar 10 and locked into a slot 30 in the first rotating shaft 12 by the shift mechanism 24. When the shift mechanism 24 is moved laterally along the shift collar 10, a slot 32 moves over the position of the detent ball 26 and allows the ball 26 to move-radially outward from the slot 30 in the first rotating shaft 12 and into the slot 32 of the shift mechanism 24. This movement is accomplished by cam action of slot 30 tapered edge 38 and results in a self-unlocking feature. As best shown in FIG. 2, continued lateral movement of the shift mechanism 24 forces the detent ball 26 and the shift collar 10 to move laterally in a corresponding manner until the lateral movement is limited by a retainer 36. The movement of the shift collar 10 forces the angled gear teeth portion 20 to disengage from the angle teeth 22 of the second rotating shaft 18. Engagement of the shift collar 10 is the reverse of this procedure. The lateral movement of the shift mechanism 24 toward the second rotating shaft 18 forces the angled gear teeth portion 20 to engage the angle teeth 22 of the second rotating shaft 18. At the point of complete engagement, the detent ball 26 is positioned over the slot 30 in the first rotating shaft 12. The engagement prevents further lateral movement of the shift collar 10 and of the detent ball 26. Continued lateral movement of the shift mechanism 24 toward the second rotating shaft 18 forces the detent ball 26 downward into the slot 30 in the first rotating shaft 12. The downward movement is achieved by a tapered edge 34 of the shift mechanism slot 32 which pushes the detent ball 26 downward against the fixed edge of the shift collar aperture 28 and results in a self-locking feature. Due to the neutral force configuration, movement of the shift collar 10 is accomplished with minimal force upon the shift mechanism 24. Additionally, the present invention provides a self-locking and self-unlocking feature with the configuration of the detent ball 26 and corresponding interfaces.

Figure 3:
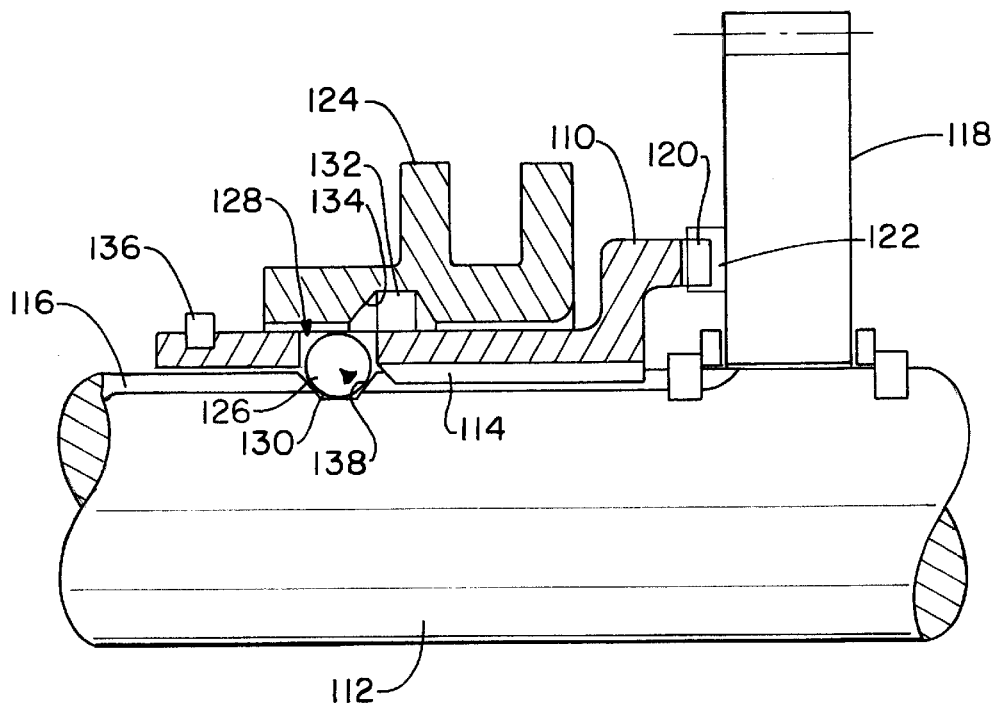
FIG. 3 shows a second embodiment of the shift collar mechanism of the present invention in the locked, torque engaging position.
Figure 4:
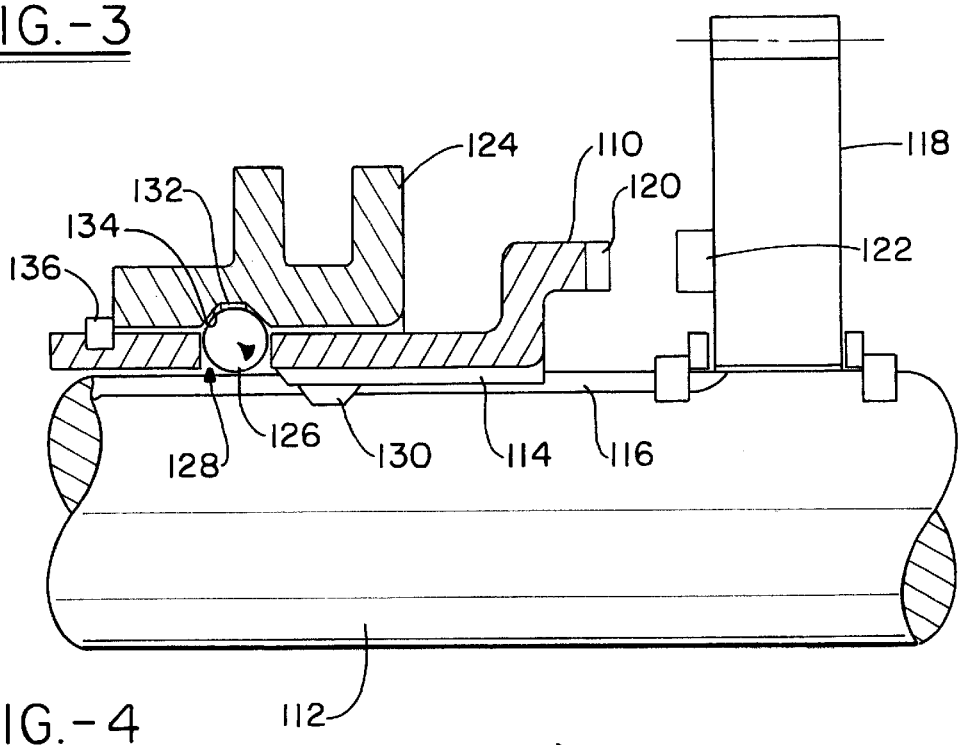
FIG. 4 shows the second embodiment of the shift collar mechanism of the present invention as shown in FIG. 3, in the disengaged position.
Figure 5:
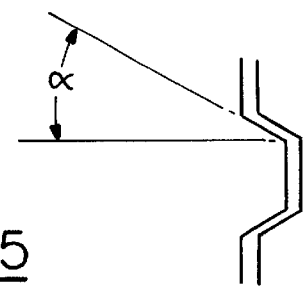
FIG. 5 shows the face tooth and corresponding angle of the engaging teeth of the present invention.

In a second embodiment of the present invention as shown in FIGS. 3 and 4, a clutch shift collar 110, is shown formed as a sleeve which is coaxial with a rotating shaft 112. The shift collar 110 is attached to the rotating shaft 112 by splines 114 which slidingly engage corresponding splines 116 of the rotating shaft 112 such that torque is transmitted from the shaft 112 through the shift collar 110 to a second member 118, shown herein as a rotating disk, via face teeth 120 displaced from the centerline of the rotating shaft 112 on which the shift collar 110 slides. The face teeth 120 are adapted to engage corresponding teeth 122 on the rotating disk 118. As shown in FIG. 5, the face tooth angle α is designed such that the force vector along the center line of the rotating shaft 112 due to torque is approximately equal to the friction force of the shift collar splines 114 along the shaft centerline. Referring back to FIGS. 3 and 4, the face teeth 120,122 and splines 114,116 are designed such that the shift collar 10 has a neutral axial force under torque. The shift collar 110 is slideable along the direction of the longitudinal axis of the rotating shaft 112. Translation of the shift collar 110 is preferably performed by means of a shift mechanism 124 in association with a detent ball 126, used to self-lock the shift collar 110 in place under torque load. The detent ball 126 is positioned within an aperture 128 of the shift collar 110 and locked into a slot 130 in the rotating shaft 112 by the shift mechanism 124. When the shift mechanism 124 is moved laterally along the shift collar 110, a slot 132 moves over the position of the detent ball 126 and allows the ball 126 to move radially outward from the slot 130 in the rotating shaft 112 and into the slot 132 of the shift mechanism 124. This movement is accomplished by cam action of slot 130 tapered edge 138 on the detent ball 126 and results in a self-unlocking feature. As best shown in FIG. 4, continued lateral movement of the shift mechanism 124 forces the detent ball 126 and the shift collar 110 to move laterally in a corresponding manner until the lateral movement is limited by a retainer 136. The movement of the shift collar 110 forces the face teeth 120 to disengage from the teeth 120 of the rotating disk 118. Engagement of the shift collar 110 is the reverse of this procedure. The lateral movement of the shift mechanism 124 toward the rotating disk 118 forces the face teeth 120 to engage the teeth 122 of the rotating disk 118. At the point of complete engagement, the detent ball 126 is positioned over the slot 130 in the rotating shaft 112. The engagement prevents further lateral movement of the shift collar 110 and of the detent ball 126. Continued lateral movement of the shift mechanism 124 toward the rotating disk 118 forces the detent ball 126 downward into the slot 130 in the rotating shaft 112 resulting in a self-locking feature. The downward movement is achieved by a tapered edge 134 of the shift mechanism slot 132 which pushes the detent ball 126 downward against the fixed edge of the shift collar aperture 128. Due to the neutral force configuration, movement of the shift collar 110 is accomplished with minimal force upon the shift mechanism 124. Additionally, the present invention provides a self-locking and unlocking feature with the configuration of the detent ball 126 and corresponding interfaces.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A clutch collar for selectively transmitting torque from a first rotating member to a second rotating member comprising:

a clutch collar sleeve coaxial with said first rotating member comprising a splined interior surface and angled gear teeth wherein said splined interior surface engages an exterior splined surface of said first rotating member and said clutch collar sleeve is slideable along the longitudinal axis of said first rotating member, wherein said angled gear teeth are adapted to engage similar angled gear teeth of said second rotating member, wherein said teeth are angled such that said clutch collar sleeve experiences a neutral axial force under a torque load.

2. The clutch collar of claim 1, wherein said clutch collar sleeve includes an aperture which houses a detent ball wherein said detent ball selectively locks and unlocks said clutch collar into position when under a torque load.

3. A clutch for selectively transmitting torque from a first rotating member to a second rotating member comprising:

a clutch collar sleeve coaxial with said first rotating member comprising a splined interior surface and angled gear teeth and an aperture positioned through a wall of said sleeve, wherein said splined interior surface engages an exterior splined surface of said first rotating member and said clutch collar sleeve is slideable along the longitudinal axis of said first rotating member, wherein said angled gear teeth are adapted to engage similar angled gear teeth within said second rotating member, a detent ball positioned within said aperture of said clutch sleeve collar, wherein said first rotating member includes a radial slot, a shift mechanism coaxial with said clutch collar sleeve and slideable along the longitudinal axis of said clutch collar sleeve and having a radial slot on an interior surface thereof, wherein said teeth are angled such that said clutch collar sleeve experiences a neutral axial force under a torque load, and wherein said detent ball in conjunction with said shift mechanism and said clutch collar sleeve engages said slots to self lock and self unlock said clutch collar sleeve in response to movement of said shift mechanism.

* * * * *